Patented Oct. 24, 1939

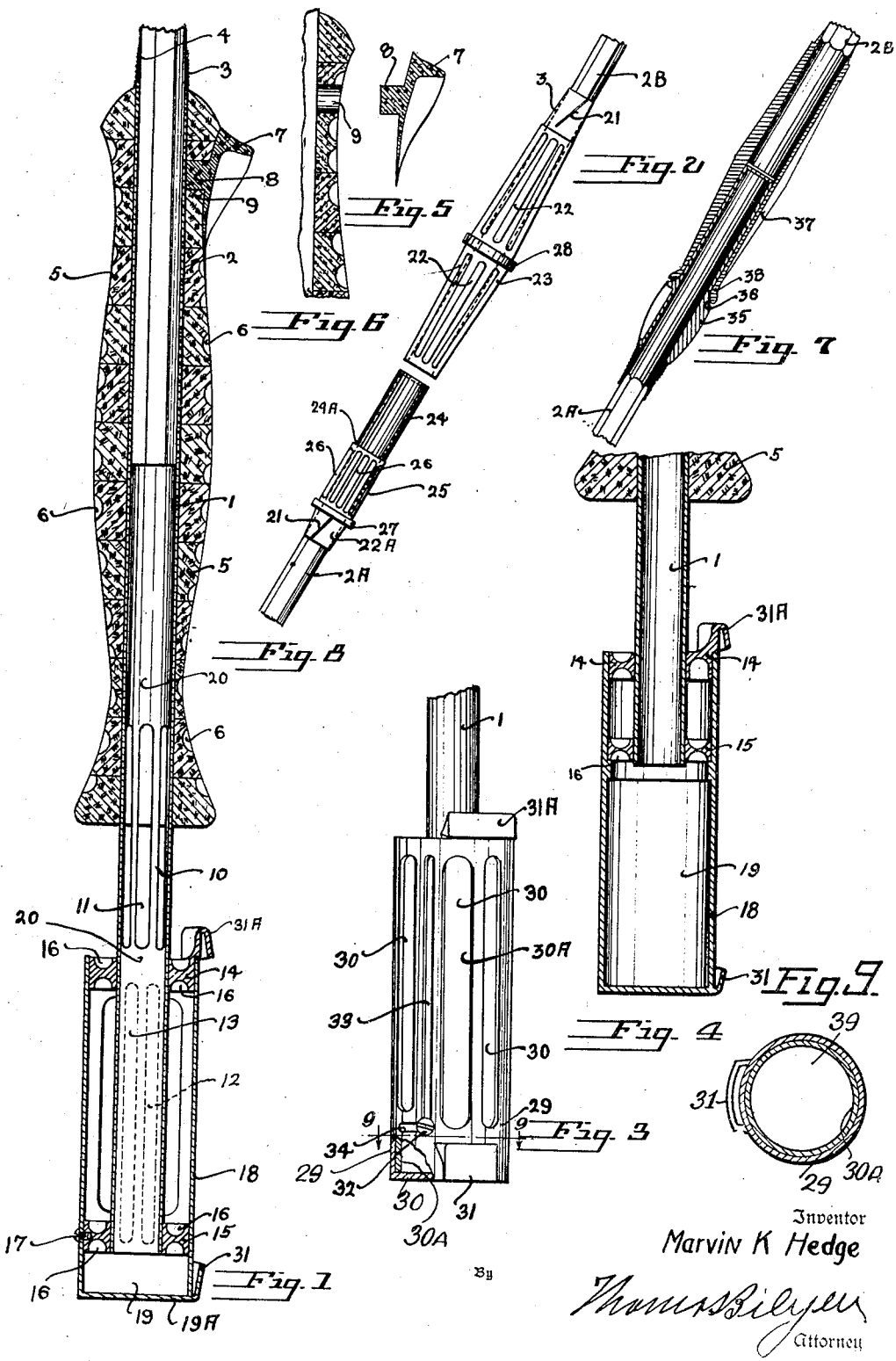

2,177,433

UNITED STATES PATENT OFFICE 2,177,433

FISHING ROD

Marvin K. Hedge, Portland, Oreg.

Application September 12, 1936, Serial No. 100,501

6 Claims. (Cl. 43—23)

My invention relates to fishing rods, the purpose and object of which is to produce a fishing rod that will be extremely light in weight, one that may be used by the fisherman with a minimum of effort in supporting the same and one that may be used for accurate casting as well as one that may be used for distance casting.

In making studies of fishing rods leading up to my becoming world's champion in distance fly casting, I have observed that the balance of the rod and the grip on the handle are essential elements for distance as well as for the accurate casting of the bait or fly.

I provide a fishing rod made up of joints of the usual character and provide ferrules at the joint through the use of which the rod may be readily disassembled for compact packaging. To accomplish this I place ferrules upon the rod that are made of non-corrosive metal and ones that are so roughened that they facilitate the unjointing of the rod without unduly straining the rod sections.

In the handle I provide a plurality of suction recesses in the outer surface of the rod that produces a handle that is pleasant to feel, one that readily absorbs the moisture of the hands in hot weather, one that may be gripped by the hand with a minimum of effort and I also provide a thumb rest in the outer end of the handle that is removable relative thereto in order that thumb rests of desired shape, contour and size may be used by the fisherman with maximum comfort and facility. I also provide a reel support at the base end of the fishing rod that is light in weight and provide a storage space within the support in which bait and fishing tackle or other paraphernalia may be stored within easy access of the fisherman.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a fragmentary side view of the handle end of a fishing rod, the reel supports secured thereto, and a handle disposed thereupon.

Fig. 2 is a side view of a joint sleeve having one of the joints of the fishing rod secured thereto and in place therein, but illustrating the same before the sleeve has been wrapped in the conventional manner to secure the same to the joint of the rod.

Fig. 3 is a side view of a bait box that is placed adjacent to the handle or base end of the first joint of the rod.

Fig. 4 is a sectional side view of the mechanism illustrated in Fig. 3.

Fig. 5 is a sectional side view of the thumb rest shown removed from the handle.

Fig. 6 is a fragmentary sectional side view of the handle. This view is made to illustrate the cups disposed upon the outside of the handle and the socket into which the thumb rest is placed and supported thereupon.

Fig. 7 is a sectional side view of a modified form of sleeve having two joints of the fishing rod secured thereto.

Fig. 8 is a side view of one end of the rod and illustrating a male ferrule secured thereto.

Fig. 9 is a sectional end view of Fig. 3. This view is taken on line 9—9 of Fig. 3 looking in the direction indicated.

Like reference characters refer to like parts throughout the several views.

I provide a tube 1 made of suitable material, preferably non-corrodible and I fashion the same to receive the base end 2 of the first joint of the rod therein. I taper the outer end of the tube 1, as illustrated at 3, to facilitate the same being wrapped in the conventional manner, as illustrated at 4. This definitely secures the base end 2 of the rod to the sleeve or tube 1. The tube 1 is provided to mount the handle and reel seat upon, so one set or handle will answer for any number of rods.

A handle 5 made of cork, or other suitable light weight material is disposed upon the outer end of the tube 1.

In order to facilitate the user getting a firmer grip on the handle and a grip that will not slip in the hands of the user when the hands are wet, I place a plurality of spaced vacuum cups 6 in the outer surface of the handle.

Where it is desired on the part of the fisherman to have a fishing rod that may be used for accurate and distance casting of the bait or lure, I provide a removable thumb rest 7 and secure the same to the handle. The thumb rest shown in the sectional side view in Fig. 1 and Fig. 5 illustrates an abutment disposed at the front end of the thumb receiving socket of the thumb rest. The thumb rest 7 may be made of cork, metal or other suitable material and the same is preferably made removable relative to the handle. This may be accomplished by placing a shank 8 upon the underside of the thumb rest, which is made to fit into and engage within a suitable socket 9 disposed within the handle member 2.

In providing a thumb rest, as here illustrated, it enables the fisherman to lessen his grip upon the handle and to relax the digits in normal grasping of the handle while fishing.

It will be noted that I have provided a thumb rest that is removable relative to the handle. The purpose and object in providing a removable thumb rest is to facilitate the fisherman using the handle with or without the thumb rest that precisely fits his thumb and also enabling the fisherman to secure separate thumb rests for use on other rods of his own choosing.

Where fishing is being done with a relatively short line, or close to shore, and to provide a different contour upon the handle, it may be desired to remove the thumb rest from the handle. A further object in providing a removable thumb rest is to provide a handle available to users having different sizes of thumbs, and who might be using the same handle. This is accomplished by substituting a thumb rest within the handle structure.

The contour of the thumb rest is made in a plurality of sizes and shapes to facilitate a thumb rest of desired shape and size, being available for different users of the fishing rod.

I provide a plurality of flutes 10 on the outer surface of the tube 1, or I may roughen the surface as by knurling. This facilitates the adaptation of the tube 1 to the handle 5. The fluting also lessens the weight of the tube 1. Where the fluting is used it forms a plurality of longitudinal grooves 11 between which is disposed a plurality of ribs 10.

Where the rod is to be used for accurate and distant casting it is highly desirable that the base end of the rod be made as light as practicable in order to give the rod the proper balance and the proper distribution of weight. I may also flute the base end of the tube 1, as illustrated in dotted lines at 12 and 13, which insures minimum weight for the tube and at the same time forms a plurality of slots 12 with strips 13 disposed therebetween.

I provide an annular disc 14 and an annular disc 15 and I space the same sufficiently apart along the tube 1. The discs 14 and 15 are recessed as illustrated at 16. A reel supporting tube 18 is secured to the respective annular discs 14 and 15 and the tube 18 may be secured thereto by the use of a set screw 17. A compartment 19 is disposed within the outer end of the tube 18 by positioning the end 19A of the tube 18 in spaced relationship with the outer annular disc 15. The annular disc 14 is positioned upon the smooth portion 20 of the tube 1 and the tube is preferably unknurled or unfluted at the location of the annular disc 14.

At each of the joints of the rod I provide a sleeve 22. The sleeve 22 is relatively large at its mid-section and tapers uniformly outward therefrom toward each end. Similar grooves 23A are provided in each of the sleeves 22 with ribs 23 are disposed therebetween and the ribs are disposed upon the outer surface of the sleeve. The purpose and object of fluting or knurling the sleeve is to facilitate a firm grasping of the same by the hand of the user to facilitate the jointing and disjointing of the rod.

A ferrule 24 is provided for one end of each joint of the rod and the outer surface of each of the ferrules is roughened as by knurling or fluting. I preferably make the same having slots 26 and ribs 25 disposed therebetween. This is also done to lessen the weight of the ferrule and at the same time to facilitate the removal of the joint from the sleeve without unduly stressing the rod itself, which is secured thereto. The ferrule that is to be fitted to the small end of the rod in each instance is made having the same taper as the rod end that is to be fitted thereinto.

In order to definitely provide a stop between the ends of the ferrules I provide a ring 27 between the ends of the ferrule. This forms an outwardly extending definite stop for the wrapping line and also provides a projecting rest against which the thumb and finger may come to rest in the disjointing and jointing of the rod. I split the outer tapered end 21 of the ferrule, as illustrated at 22A.

It has been the general custom heretofore in the manufacture of ferrules to provide a shoulder 24A, as illustrated in Fig. 8. It has been my experience that shoulders thus made weaken the ferrule and if the ferrule is made of relatively light material there is a tendency for the ferrule to break, when made as illustrated at 24A.

I have found much better results are to be obtained where the ferrule and the sleeve are made as illustrated in Fig. 7.

The ferrule 35 is fluted, knurled or roughened about its outer surface and instead of forming a shoulder, as illustrated at 24A, which is the common practice, I form a fillet 36 therein and I outwardly curve the end 38 of the sleeve. This greatly strengthens the structure and enables me to form the jointing material of extremely light non-corrodible material and it also further lessens the tendency of the material to crystalize when frequent jointing and disjointing of the rod occurs and which also occurs where the rod is being used over relatively long periods and where the same is being stressed in the constant casting operation and in the landing of the catch.

The outer surface of the sleeve, as illustrated in Fig. 7, is knurled, or fluted, as illustrated in Fig. 2 and as illustrated at 37, where the same is to be fluted.

Where the reel support is to be used as a bait box or as a tackle receptacle, it is preferably made as illustrated in Fig. 4, and when so made the annular discs 14 and 15 are spaced relatively close together upon the base end of the tube 1 and the reel support when positioned upon the discs 14 and 15 leaves a relatively large bait and tackle receptacle 19 therein that may be maintained in a water-tight condition which would also facilitate its being used as a match box or holder. This receptacle is particularly valuable as a fly and tackle container.

Where my device is to be used in tournament work or for exhibition purposes it is highly essential that the device be of minimum weight and yet meet the requirements and rules for tournament casting. To meet such rules and reel supports 31 and 31A, disposed at each end of the reel support, may be formed integral with the sleeve 18 or the same may be formed integral with the annular discs 14 or 15 or independently thereof. In any event they must be so fashioned that by the longitudinal movement of the tube 18 the locking supports 31 and 31A will move away from or toward each other to facilitate the placing of the base of the reel therebetween which is locked relative thereto by the locking supports 31 and 31A after the reel is in place therebetween.

Where the device is to be used primarily for fishing purposes and by sportsmen in the plying of streams, lakes or ponds, I make the reel support as illustrated in Fig. 3 and when so made the device is composed of inner and outer tubular members with the inner tubular member 30A having a single slot 30 running longitudinally thereof and the outer sleeve 29 having a number of slots 30 disposed through the shell of the outer tube. The purpose of making a number of slots 30 is to lighten the tube.

The outer sleeve is rotatable relative to the inner sleeve to place the respective longitudinal slots into and out of registry with each other. The articles may be placed within the holder or removed therefrom. When the same are removed the interior of the same is locked to seal the remaining material disposed therein. The freedom of movement or rotation is prevented and predetermined by placing a slot 34 within the outer sleeve 29. A set screw 32 is secured to the inner sleeve 30A. The rotation of the outer sleeve uncovers the opening 30 when the outer sleeve 29 is rotated in one direction and closes the same when rerotated. The outer surface 29 is roughened, knurled or fluted to facilitate the same being firmly grasped by the hands of the user.

Where the structure, as illustrated in Fig. 3, is to be used primarily for fishing, the same would have a bottom therein to form a compartment into which bait, tackle, matches and so forth, may be placed, but where the same is to be used for tournament purposes it may be found desirable to limit the weight by eliminating the end cap 19A therefrom.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a handle for fishing rods, said handle being made of light weight material and having a plurality of half-spherical indentures disposed upon its exterior, said handle being tubular along its longitudinal axis and having a suitable socket disposed therein adapted for receiving the shank of a thumb rest therein, a thumb rest suitable for attachment to the handle and for being removably secured thereto and a shank outwardly extending from the base side of the thumb rest and adapted for engagement into the socket disposed within the handle.

2. A handle for fishing rods made of moisture impervious material, said handle being tubular throughout its major length, a tube disposed therein and removable relative to said handle, and a plurality of spaced instrumentalities associated with the exterior of the handle to insure firm gripping of the handle by the user, and a thumb rest associated with and disposed adjacent one end of the handle and said thumb rest being removable relative to said handle, and having an abutment disposed at its forward end.

3. In a device of the class described, the combination of a sleeve, a handle disposed upon the sleeve, said handle having a plurality of vacuum cups disposed upon its outer periphery, and a thumb rest removably secured to one end of the handle the thumb rest having an abutment disposed at its forward end.

4. In a device of the class described, the combination of a tube, said tube having corrugations disposed upon its exterior between its ends, a handle disposed upon the forward end of the tube, said handle having a plurality of vacuum cups disposed upon its exterior and having a thumb rest removably secured to the handle and placed adjacent its outer end and a thumb receiving socket disposed in the thumb rest to act as a position for the thumb, and an abutment disposed at one end of the thumb receiving socket.

5. In a fishing rod handle, the combination of a handle and a thumb rest, said thumb rest being detachably secured to said handle, a projection disposed on the base of said thumb rest and a socket in the side of said handle into which said projection fits.

6. In a fishing rod handle, the combination of a tubular handle and a removable thumb rest, said thumb rest being of varying thickness, a shoulder disposed on the forward end of the rest, and being removably secured to said handle, a basal projection disposed on the bottom of the thumb rest, and a socket disposed in the side of said tubular handle and positioned to receive the basal projection therein.

MARVIN K. HEDGE.